March 5, 1935. W. E. URSCHEL 1,993,197
BEAN CUTTER
Filed March 30, 1931 3 Sheets-Sheet 1

INVENTOR.
William E. Urschel
BY
ATTORNEY

March 5, 1935. W. E. URSCHEL 1,993,197
BEAN CUTTER
Filed March 30, 1931 3 Sheets-Sheet 2

INVENTOR.
William E. Urschel
BY
ATTORNEY

March 5, 1935. W. E. URSCHEL 1,993,197
BEAN CUTTER
Filed March 30, 1931  3 Sheets-Sheet 3

INVENTOR.
William E. Urschel
BY
ATTORNEY

Patented Mar. 5, 1935

1,993,197

UNITED STATES PATENT OFFICE 1,993,197

BEAN CUTTER

William E. Urschel, Valparaiso, Ind.

Application March 30, 1931, Serial No. 526,235

13 Claims. (Cl. 146—86)

This invention relates to a bean cutter and more particularly to a machine for cutting green bean pods into pieces or sections preparatory to canning. This machine is an improvement and modification of the bean cutter for which application for Letters Patent was filed April 15, 1926, Serial Number 102,114, which application has since matured into Letters Patent 1,794,743.

One of the objects of the present invention is to provide a simple and efficient bean pod cutting machine which divides the bean pods into sections of uniform length and gauges the lengths of the sections in which the pods are cut from one end thereof.

A still further object of the invention is to provide an improved and novel feeding mechanism in connection with a bean cutting machine which feeding device will gather the bean pods in such a manner that they will be fed or presented to the cutting mechanism so that such cutting mechanism will divide the bean pods in lines transverse to their longitudinal lengths.

A still further object of the invention is to provide an improved shaker mechanism which will cooperate with the improved bean cutting mechanism in such a manner that the smaller particles discharged with the cut pieces of bean pods will be separated from the cut pieces.

Another object of the invention is to provide a means whereby the cutting edges of the improved bean cutting mechanism will be protected from damage by injurious materials, such as nails, pieces of steel, rocks or other hard materials which might enter the machine with the bean pods.

A still further object of the invention is to provide an improved method of driving the cutting mechanism of a bean cutting machine.

These, and other objects as may hereinafter appear are accomplished by providing a construction and arrangement of the various parts in a manner hereinafter described and particularly pointed out in the appended claims.

In the drawings, hereby made a part of this specification:

Like reference characters are used to designate similar parts in the drawings and in the description of the invention which follows.

Figure 1:
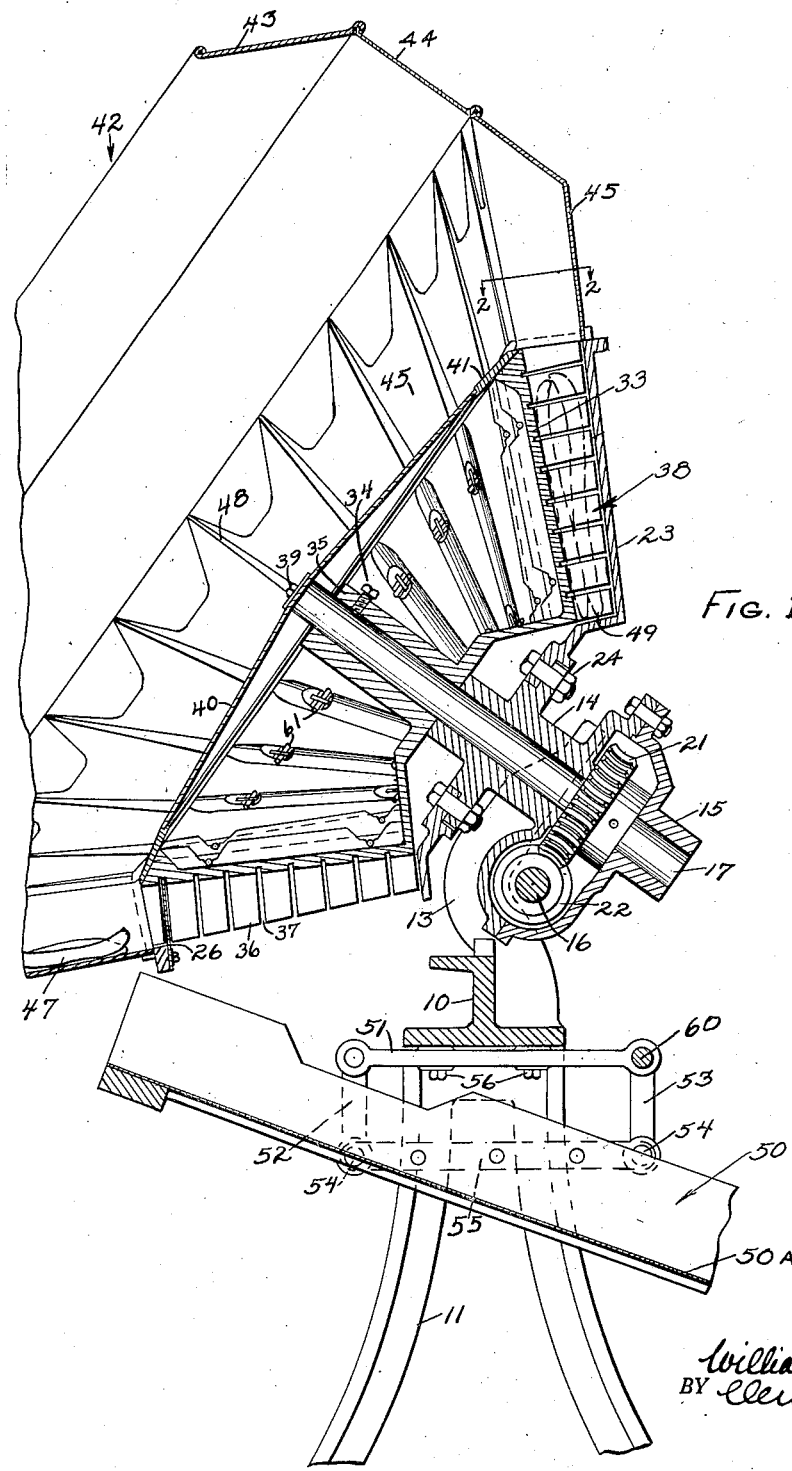
Figure 1 is a side elevation of the improved bean cutting machine herein described with certain parts thereof shown in cross section.
Figure 2:
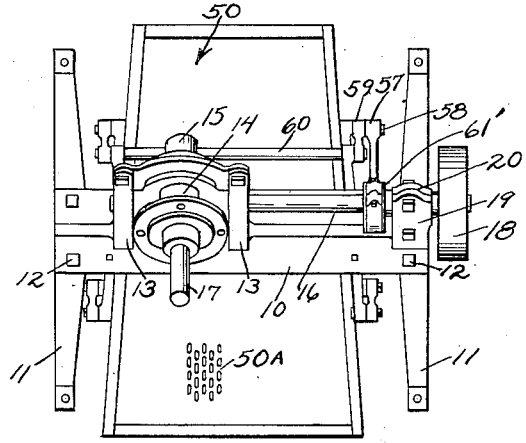
Figure 2 is a plan view of the machine shown in Figure 1 with the hopper and parts associated with the hopper removed.
Figure 3:
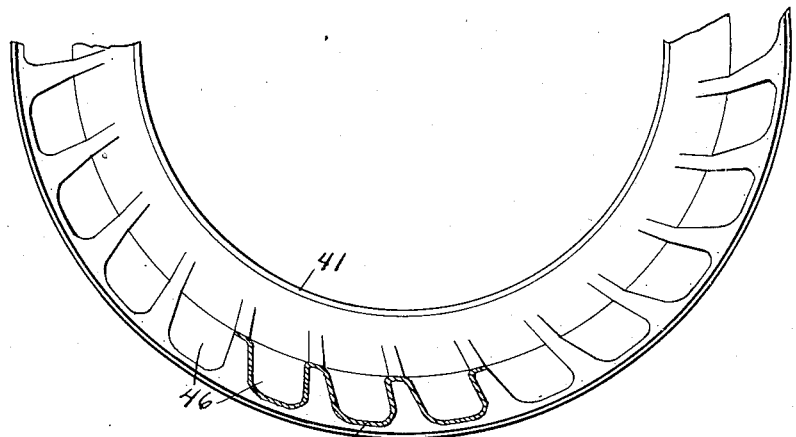
Figure 3 is a fragmentary plan view of the hopper supporting ring showing the details of the frame to which hopper pockets are fastened.

In carrying out the invention, there is provided a main frame member 10 which is mounted on oppositely disposed legs or standards 11. The legs 11 may be secured to the main frame member 10 by means of bolts 12, or by other suitable fastening members.

Formed integrally with the main frame member 10 (or separately if preferred) are extending arms 13 to which are secured housings 14 and 15 which contain bearings for a main drive shaft 16 and for a bowl shaft 17.

Mounted on one end of the main shaft 16 and keyed thereto is a driven pulley 18 by means of which power from a prime mover (not shown) is transmitted to the bean cutting machine here shown.

Formed integrally with the main frame 10 and extending upwardly is an arm 19 which, with a cap 20, forms an additional bearing for the main drive shaft 16.

The bowl shaft 17 is disposed at an angle of slightly less than 45 degrees with respect to the horizontal and it is supported at its upper end by a bearing formed in bracket 14. The lower end is supported by a bearing formed in bracket 15. The shaft 17 has secured at its lower end a worm gear 21 which is in meshing relation with a worm 22 keyed to the main shaft 16.

Secured to a disc portion of bearing bracket 14 is a stationary or knife supporting bowl 23. The stationary or knife supporting bowl is secured to bearing bracket 14 by means of bolts 24, or in any other suitable manner.

The stationary knife supporting bowl 23 is in the form of an inverted frustum of a cone or in the shape of a dish with the bottom thereof raised. The bowl 23 has a section of its inclined side cut away as shown in 24, Figure 7, which opening forms an aperture for permitting the pieces of beans to drop therethrough. Such cut away portion 24 is slightly less than one fourth of the bowl 23.

Adjacent one edge of the cut away portion 24 and extending concentrically with respect to the longitudinal axis of the bowl 23 are a plurality of knives or cutters 25 and 26. The knives 25 and 26 are arranged or spaced apart equal distances adjacent the cut away portion and the distances between them represent the lengths of the pieces into which the bean pods are to be cut.

The cutting edges of the knives 25 and 26 are beveled as shown at 27. When the bean pods approach the knives 25, as the beans are being revolved in a clockwise direction, the knives will have a shearing effect on the bean pods and render the severing of the pods a simple and easily accomplished operation.

Knife 26 is extended over opening 24 to prevent bean pods in the hopper from escaping through the space occupied thereby before passing through the cutting mechanism.

Adjacent to the lower end of knives 25 is a frame 32 secured to the stationary knife supporting bowl 23 by means of cap screws 31. In frame 32 are reciprocally mounted spring rods 29 which are held against knives 25 by the action of springs 28. The pressure of reciprocating rods 29 against knives 25 may be varied by means of a nut 30 which varies the tension of spring 28.

Figure 6:
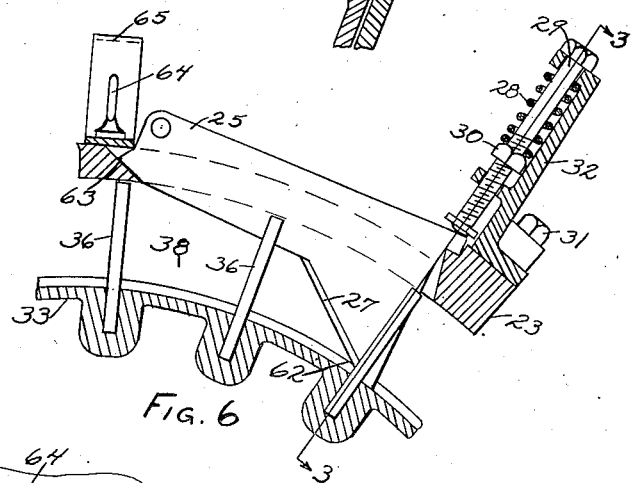
Figure 6 is a cross section taken on lines 4—4 of Figure 7 looking in the direction of the arrows and forming a plan view of one of the cutting knives and a sectional view of the releasing mechanism.
Figure 7:
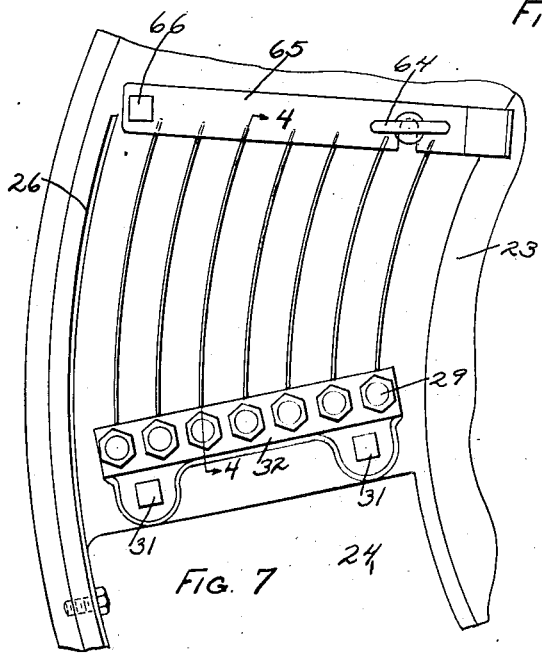
Figure 7 is a plan view showing the position of the cutting edges on the outside or knife supporting bowl.

The upper ends of knives 25 are secured by means of a strap 65 which in turn is secured to the stationary or knife supporting bowl 23 by means of cap screw 66 and thumb screw 64 clearly shown in Figures 6 and 7.

To remove knives 25, thumb screw 64 is loosened to allow securing strap 65 to swing out of position about cap screw 66 allowing the knives 25 to be removed.

When any foreign material such as nails, pebbles, or other hard substances, enters inner pockets 38, the ribs 36 will crowd the foreign material to a point 62, Figure 6. If the material is too hard to cut it will cause knife 25 which such hard material engages to force back spring rods 29 and hinge about point 63, creating an opening at point 62 through which the hard material may escape and drop on to shaker 50 without causing injury to the cutting edge 27 or stopping the bean cutting machine.

Mounted concentrically to and rotatable with respect to the outer knife holder bowl 23 is an inner or rotatable bowl 33. Formed integrally with the inner bowl 33 is a hub 35 keyed to the shaft 17 and secured by a setscrew 34. The bowl 33 is in the shape of an inverted frustum of a cone and has its conically shaped wall provided with a plurality of ribs 36. The ribs 36 are secured in the slotted sections of bowl 33 by means of pins 61. The ribs 36 are spaced apart and occupy different planes passing through the longitudinal axis of the bowl. Ribs 36 are slotted as shown at 37 Figure 1, so as to permit the inner or revolving bowl 33 to pass freely by the spaced apart cutters or knives 25 and 26.

The conically shaped wall of bowl 33 and the ribs 36 together with the conically shaped wall of the outside bowl 23 forms a plurality of pockets 38, shown in Figures 1 and 6, in which bean pods 47 are collected, supported, and conveyed to the cutting knives 25 with their longitudinal dimensions extending longitudinally of the pocket 45.

Secured to the upper end of shaft 17 by means of a cap screw 39 which is in threaded engagement with a threaded aperture in the end of the shaft 17 is a plate or disc 40. Attached to the periphery of plate or disc 40 by means of rivets or otherwise is a hopper supporting ring 41.

Mounted on the inner rotatable bowl 33 is a hopper 42. The hopper 42 is in the form of a cylindrical drum having an upper conically shaped portion 43 secured in a conventional manner to a cylindrical portion 44. These two portions (43 and 44) are secured to the lower portion 45 of hopper 42 in any conventional manner.

Figure 4:
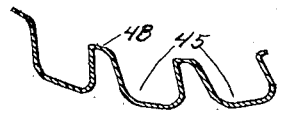
Figure 4 is a cross section of several pockets taken on the line 2—2 of Figure 1 and looking in direction of the arrows.
Figure 5:
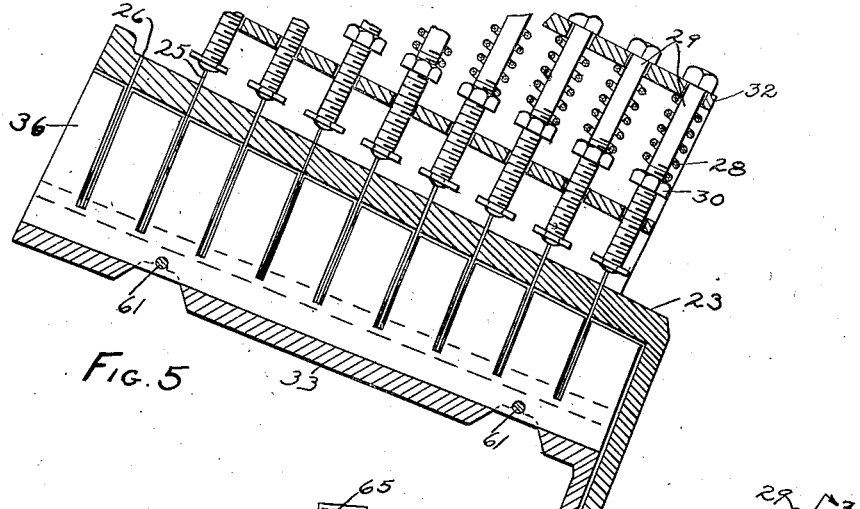
Figure 5 is a cross section on the line 3—3 of Figure 6 and looking in the direction of the arrows and showing the releasing mechanism for the cutting knife.

Portion 45 of hopper 42 is made up of a plurality of pockets or troughs arranged about its periphery. A fragmentary portion of such pockets is shown in section in Figure 4. The lower portions of pockets or troughs 45 are open and are secured to the openings 46 in hopper supporting ring 41 in any suitable manner. By means of supporting ring 41 and disc or plate 40, hopper 42 is supported for rotation with inner bowl 33.

By reference to Figure 1 of the drawings, it will be noted that by reason of the shape of the revolving hopper and the angular position in which it is mounted on the shaft 17, the pods shown at 47 normally occupy a prostrate position in the lower position of the hopper because of the horizontal position of the conical portion 45 of the hopper. It will also be noted that when the pods reach their uppermost position the conically shaped portion 45 of the hopper assumes substantially a vertical position.

In the operation of the mechanism thus far described, the bean pods are emptied into the open side of the hopper which is adjacent the conical portion 43 of the hopper, and the hopper is then revolved by the power mechanism in a clockwise direction. The beans that lay in a position lengthwise of the pockets or troughs 45 drop or slide into these pockets or troughs. The walls 48 forming a division between the pockets or troughs cause the beans to adjust themselves or roll into the pockets.

In other words, the lowermost 120 degrees of rotation of the cycle of operation causes the bean pods in the machine to take a position with their longitudinal lengths lying longitudinally of the pockets or in a position so that they will fall readily into the out pockets 45.

While the pockets 45 are in positions beginning from the fourth quadrant of the cycle of movement of the hopper and ending with the first thirty degrees of the first quadrant of the cycle of operation, the bean pods will slide from outer pockets 45 into the inner pockets 38, formed by the tapered walls of both the inner and outer bowls and the ribs 36. When the bean pods reach the inner pockets 38, they extend longitudinally of the pockets and have one of their ends resting against the bottom 49 of the outer bowl 23 as is clearly shown in Figure 1.

The beans are conveyed and supported in this position until they approach the cutting edges 27 of the knives 25, which knives cut the bean pods in pieces.

After the cut pods have passed the knives, the sections of bean pods are dropped through the opening 24 of the cut away portion in the conical wall of the outer bowl 23, from whence they are dropped onto a reciprocating shaker 50 which is provided with a screened bottom 50a.

The shaker 50 is pivotally supported to the frame of the machine by means of member 51 attached to the main frame 10 by capscrews 56 to which member are fastened links 52 and 53.

Links 52 and 53 are pivotally connected by means of pins 54 to the shaker supporting member 55.

The shaker 50 is operably driven by a connecting rod 57 which has one end pivotally connected, as shown, at 58 to a link 59 secured to a jack shaft 60. Links 53 are secured to shaft 60 connecting to shaker 50 by means of member 55 at pins 54.

The other end of the connecting rod 57 is operably connected to an eccentric 61 which is mounted on the main drive shaft 16.

I claim:

1. Cutting means comprising a frame, a knife blade, means engaging the back edge of one end of said blade for securing such end upon said frame, and compressible means engaging said blade at its back at its other end.

2. Cutting means comprising a frame, a knife blade, removable means engaging the back edge of one end of said blade and providing a pivot for movement of said blade at its other end, and a resilient support for the back edge of the other end of said blade.

3. Cutting means comprising a frame, a knife blade having end extensions, a removable member for engaging one extension of said blade upon said frame, and a compressible member engaging the other extension to maintain said blade normally in a cutting position.

4. Cutting means comprising a frame, a knife blade having an end extension, means detachably secured upon said frame engaging said extension for securing said blade at one end intermediate said frame and said detachable member, and a flexible means for securing the other end of said blade on said frame.

5. Cutting means comprising a frame, a knife blade having end extensions, means detachably secured to said frame for holding one extension of said blade between said frame and said detachable means, and a resilient support engaging the other extension of said blade to admit of the displacement of said blade under abnormal conditions of operation.

6. In a cutting means, a frame, a cutting blade, means engaging the back edge of said blade at one end for holding said blade against displacement other than radially of said blade with said end as a pivot, and means for holding the other end of said blade comprising a resilient support engaging the back edge of the other end of said blade.

7. In a cutting means, a frame, a cutting blade, means for holding said blade at one end against displacement other than radially of said blade with said end as a pivot, and means for holding the other end of said blade comprising a rod engaging said blade, and a spring for urging said rod against said blade.

8. In a cutting means, a frame, a cutting blade, means for holding said blade at one end against displacement other than radially of said blade with said end as a pivot, and means for holding the other end of said blade comprising a rod engaging said blade, a spring for urging said rod against said blade, and means for modifying the urge of said spring upon said rod.

9. A bean pod cutting machine comprising a frame, a stationary bowl mounted on said frame, a plurality of spaced apart knives carried by said stationary bowl, and a second bowl rotatable within said stationary bowl and having a plurality of pockets disposed at one side thereof and adapted to receive and convey bean pods to said knives to be severed, said pockets comprising an intermediate wall and opposed side walls, the side walls being slightly divergent one from another and angular to said intermediate wall.

10. A bean pod cutting machine comprising a frame, a stationary bowl mounted on said frame, a plurality of spaced apart knives carried by said stationary bowl, and a second bowl rotatable within said stationary bowl and having a plurality of pockets of irregular configuration adapted to receive and convey bean pods to said knives to be severed, each of said pockets having an external section and two side sections, the two side sections being angular to said external section, the angularity of one of said sides being sufficient to provide an overhanging part preventing the unseating of beans from said pocket.

11. A bean pod cutting machine comprising a frame, a stationary bowl mounted on said frame, a plurality of spaced apart knives carried by said stationary bowl, and a second bowl rotatable within said stationary bowl and having a plurality of pockets having angular substantially parallel walls adapted to receive and convey bean pods to said knives to be severed.

12. A bean pod cutting machine comprising a frame, a stationary bowl mounted on said frame, a plurality of spaced apart knives carried by said stationary bowl, and a second bowl rotatable within said stationary bowl and having a plurality of pockets radially disposed in said second bowl and having side walls sloping in a manner providing a receiving space shaped like the frustrum of a pyramid and adapted to receive and convey bean pods to said knives to be severed.

13. A bean pod cutting machine comprising a frame, a cutting mechanism mounted on said frame, means for gathering and conveying the bean pods and adapted to present their longitudinal lengths transversely to said cutting means, said means comprising pockets, each of said pockets having an external section and two side sections, the two side sections being angular to said external section, the angularity of one of said sides being sufficient to provide an overhanging part preventing the unseating of beans from said pocket, and a chute mounted upon said frame for reciprocal movement in a fixed angular plane for conveying the cut pieces of bean pods to one side of the machine.

WILLIAM E. URSCHEL.